United States Patent [19]

Eick et al.

[11] Patent Number: 5,364,231
[45] Date of Patent: Nov. 15, 1994

[54] FULL AUTHORITY PROPELLER PITCH CONTROL

[75] Inventors: Christopher D. Eick, Phoenix; Paul J. Powers, Glendale; John R. Williamson, Scottsdale, all of Ariz.

[73] Assignee: AlliedSignal Inc., Morris Township, Morris County, N.J.

[21] Appl. No.: 994,741

[22] Filed: Dec. 22, 1992

[51] Int. Cl.⁵ .............................................. B64C 11/40
[52] U.S. Cl. ................................. 416/157 R; 416/48; 91/433; 91/449; 91/461
[58] Field of Search ............... 416/47, 48, 156, 157 R; 91/417 R, 433, 449, 461

[56] References Cited

U.S. PATENT DOCUMENTS

| | | |
|---|---|---|
| 3,395,762 | 8/1968 | Itazawa . |
| 3,501,251 | 3/1970 | Haglund et al. . |
| 3,554,086 | 1/1971 | Wills ........................ 91/417 R |
| 3,583,828 | 6/1971 | White ........................ 416/48 |
| 3,664,762 | 5/1972 | Lachnit . |
| 4,028,004 | 6/1977 | Wind . |
| 4,097,189 | 6/1978 | Harlamert . |
| 4,132,503 | 1/1979 | Kreft et al. ............... 416/157 R |
| 4,142,835 | 3/1979 | Hisada . |
| 4,523,891 | 6/1985 | Schwartz et al. . |
| 4,533,296 | 8/1985 | Duchesneau et al. ........ 416/47 |
| 4,650,402 | 3/1987 | Jones, Jr. et al. . |
| 4,671,737 | 6/1987 | Whitehouse . |
| 4,756,667 | 7/1988 | Wyrostek et al. ........... 416/48 |
| 5,042,966 | 8/1991 | Schwartz et al. ........... 416/47 |
| 5,054,369 | 10/1991 | Wardle et al. .............. 91/361 |

FOREIGN PATENT DOCUMENTS 0675413  7/1952  United Kingdom ............ 416/47

Primary Examiner—Edward K. Look
Assistant Examiner—Christopher Verdier
Attorney, Agent, or Firm—Troy Lester; James W. McFarland

[57] ABSTRACT

A control for a hydraulic propeller pitch actuator includes a low power pilot valve responsive to digital electronic input signals to control movement of a hydraulic servomotor driving a higher power servovalve. Negative feedback motion is delivered from the servomotor to both the pilot valve and the servovalve.

18 Claims, 2 Drawing Sheets

FULL AUTHORITY PROPELLER PITCH CONTROL

TECHNICAL FIELD

This invention relates to a propeller pitch control apparatus for hydraulically operated variable pitch systems.

BACKGROUND OF THE INVENTION

Variable pitch propellers are employed in various applications including turboprop engines. Turboprop engines have proven to be desirable for aircraft because of high reliability and fuel efficiency. A turboprop engine uses a gas turbine engine to provide shaft power that rotates propeller blades. The blades provide thrust to propel an aircraft. The thrust is varied by changing the pitch of the blades. Forward thrust is achieved by rotating the blades to a positive angle. At cruise, the blades are adjusted to the intermediate positive position reducing engine torque and saving fuel. During landings, the blades are rotated to a negative angle to provide reverse thrust.

Propeller pitch for hydraulic applications is generally controlled through three devices: a propeller pitch control, a propeller governor, and a feathering valve. The propeller pitch control is operated through the use of a power lever connected to pitch control cam. The propeller pitch control allows the operator to adjust the blade pitch during ground operation, typically between the reverse and flight idle positions. The propeller governor automatically adjusts the blade pitch, typically between the flight idle and full power positions, to maintain a predetermined engine speed. The governor uses flyweights to mechanically start a chain reaction when engine speed increases above the predetermined speed by opening a pilot valve plunger to increase blade pitch. This increases engine load which will decrease engine speed back to the predetermined speed. Finally, the feathering valve is essentially a safety device to mechanically position the blade in the full feather position during emergencies. The device is a mechanically operated valve that, when opened, dumps the oil from the pitch control system and adjusts the blades to the full feather position.

Typically these systems operate a single acting propeller pitch control piston. In a single acting pitch system, the hydraulic fluid supplied by the prop governor or the pitch control is fed through a beta tube to bias the propeller pitch control piston against a spring. For a dual acting piston, two sources of oil are typically controlled by the same types of mechanisms mentioned above or other mechanical actuators connected to a spool type valve. These oil supplies are typically fed to the pitch control piston and react against each other to move the control piston.

While hydraulic pitch control systems are well known in the art and have good reliability, they require heavy and complicated actuation devices and associated linkages. Another problem is that the governor requires speed error to adjust the blade pitch resulting in fluctuations of blade pitch during transient conditions. Still another problem is that the pitch control cam requires large mechanical loads to operate.

Accordingly, a need exists for a pitch control device that can vary blade pitch from the reverse position to the feather position with a fewer number of components, that can control blade pitch during flight with minimum speed error, and that does not require great mechanical loads to operate.

SUMMARY OF THE INVENTION

The invention is an improvement to a hydraulically controlled variable pitch control assembly that includes a follow-up servo piston operated by a FADEC (Full Authority Digital Engine Control) controlled stepper motor. Thus, the propeller pitch can be controlled by the FADEC similar to existing fuel control systems by using data from various sensors that indicate flight conditions and engine speed. This will allow the FADEC to control the change in propeller pitch through the follow-up servo piston, and thus, greatly decrease the overall system weight by removing the propeller governor, the pitch control and the feathering valve. The present invention also eliminates fluctuations during transient conditions attributed to the flyweights in the propeller governor and removes the mechanical loads associated with the pitch control cam.

Accordingly, it is an important object of the present invention to provide a highly simplified propeller pitch control system directly responsive to low power electrical control signals as may be generated by a full authority digital engine control. The control signals control opposite directions of motion of a hydraulic servomotor which mechanically-positions a hydraulic power servo control valve. Movement of the power servo control valve then ports fluid in and out of the propeller pitch actuator.

These and other objects and advantages of the present invention are specifically set forth in or will become apparent from the following detailed description of a preferred embodiment of the invention, when read in conjunction with the accompanying drawings.

DETAILED DESCRIPTION OF THE PREFERRED EMBODIMENT

Figure 1:
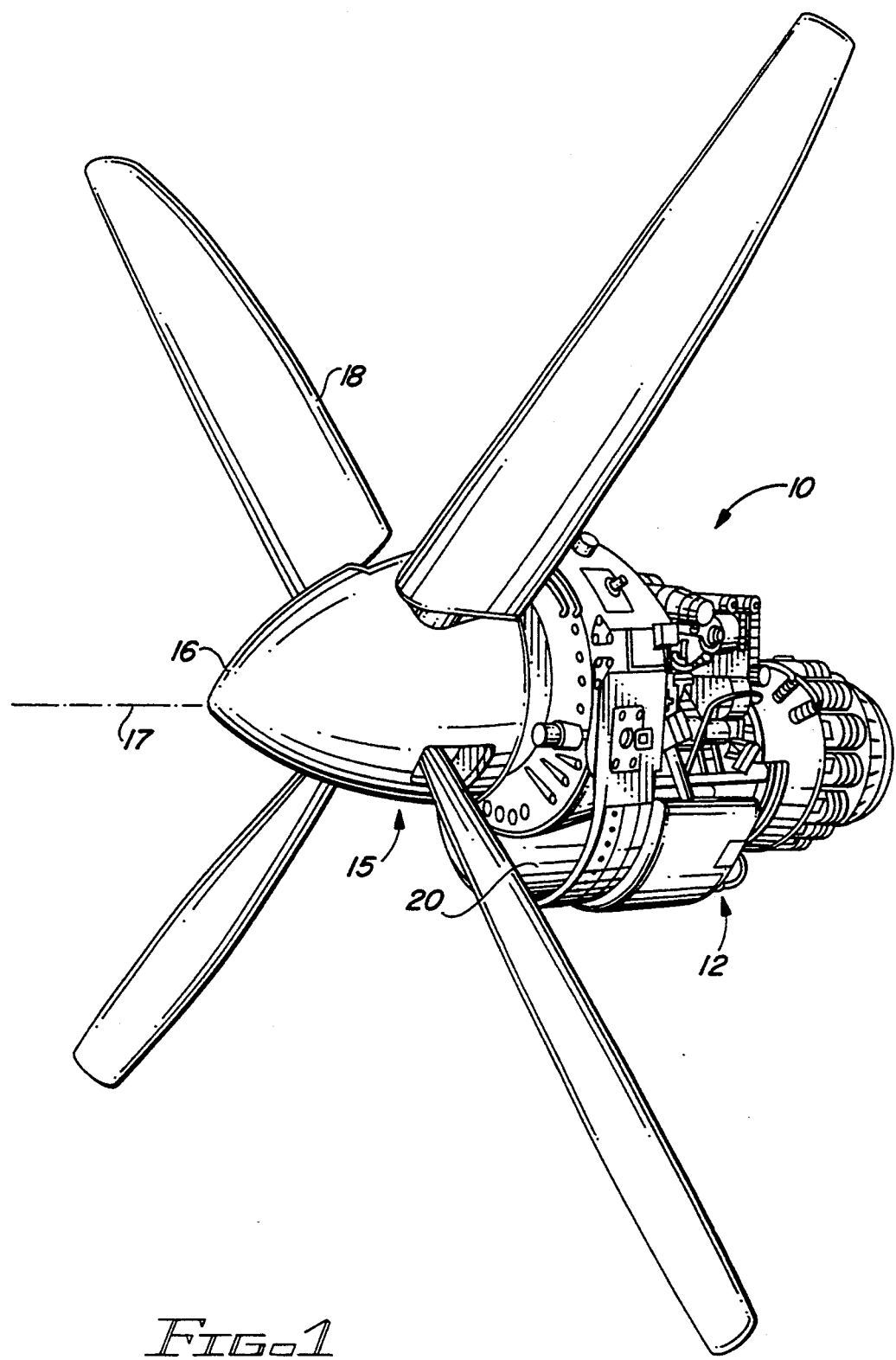
FIG. 1 is a perspective view of a turboprop engine employing a pitch control device according to the present invention.

Referring to the drawings, FIG. 1 shows a turboprop engine 10 including a core engine 12 and a variable pitch propeller assembly 15. The core engine 12 is comprised of an air inlet 20, a compressor section (not shown), a combustor section (not shown), and a turbine section (not shown), all assembled in a flow series relation. Journaled to the forward end of the core engine 12 is the variable pitch propeller assembly 15 comprising a plurality of propeller blades 18 circumferentially disposed about and radially extending from a propeller hub 16. In operation, the core engine 12 provides shaft power to the propeller assembly 15 by compressing air in the compressor section, combusting the compressed air with fuel in the combustor section and expanding the combustion products in the turbine section to provide shaft power. The shaft power is used to rotate the blades 18 about axis 17 to move ambient air and provide thrust for an aircraft (not shown).

Figure 2A:
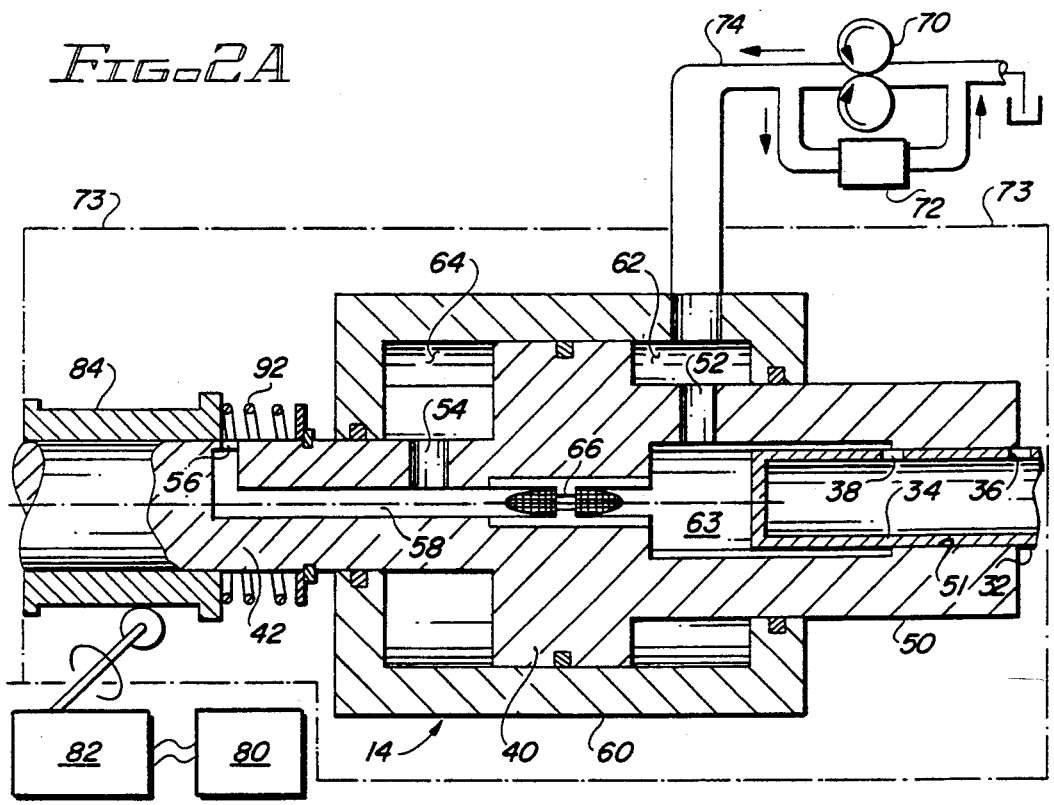
FIG. 2A is a cross-sectional view of a follow-up servo piston propeller pitch controller according to the present invention.

Referring to FIG. 2A, a full authority propeller pitch control 14 is comprised of a hydraulic servo motor in the form of a double-acting, linear servo piston 40 that is translated within a housing 60 by hydraulic fluid supplied from a pump 70 to opposing chambers 62, 64. A low power pilot control valve, in the form of a pilot sleeve 84, is responsive to a stepper motor 82 and a full authority digital engine control (FADEC) 80 to control the movement of the servo piston 40. Integral to the servo piston 40 is a first bored rod or shaft 50 that extends through one side of the housing 60 and receives one end of a hollow beta tube 32 described in greater detail below. The shaft 50 has a blind bore presenting a chamber 63 communicating with chamber 62 through passage 52, and has an end section 51 that has a smaller diameter that is approximately equal to the diameter of the beta tube 32. The diameter of end section 51 must be great enough to allow the beta tube to slide relative thereto.

Extending from the opposite face of piston 40 is a second rod or bored shaft 42 with a duct 58 extending to an exhaust port 56. A hole 54 allows fluid to flow between duct 58 and chamber 64. Shafts 50 and 42 are sized such that the reaction area of piston 40 subject to the fluid pressure from chamber 64 is greater than the area of piston 40 subject the opposing fluid pressure from chambers 62 and 63 combined.

The pump 70 continuously supplies the hydraulic fluid which can be recirculated through a relief valve 72 if the pressure in the housing 60 becomes too great. The hydraulic fluid from pump 70 is supplied to chamber 62 through conduit 74. The fluid flows through an orifice 66 in a flow restricting passage through piston 40, and passes between chambers 62 and 64. The fluid dumps from the housing 60 into a low pressure return such as the sump of a surrounding gearbox 73 (depicted by dashed lines for simplicity) through the exhaust port 56. The fluid also exits to low pressure return from the interior 34 of beta tube 32 through an opening 36. Pressurized fluid is supplied into the interior 34 of tube 32 through opening 38. Reduced diameter land 51 acts as a power servo control valve in covering and uncovering openings 36, 38 in their communications with the low pressure return gearbox 73 and pressurized bore 63, respectively.

Figure 2B:
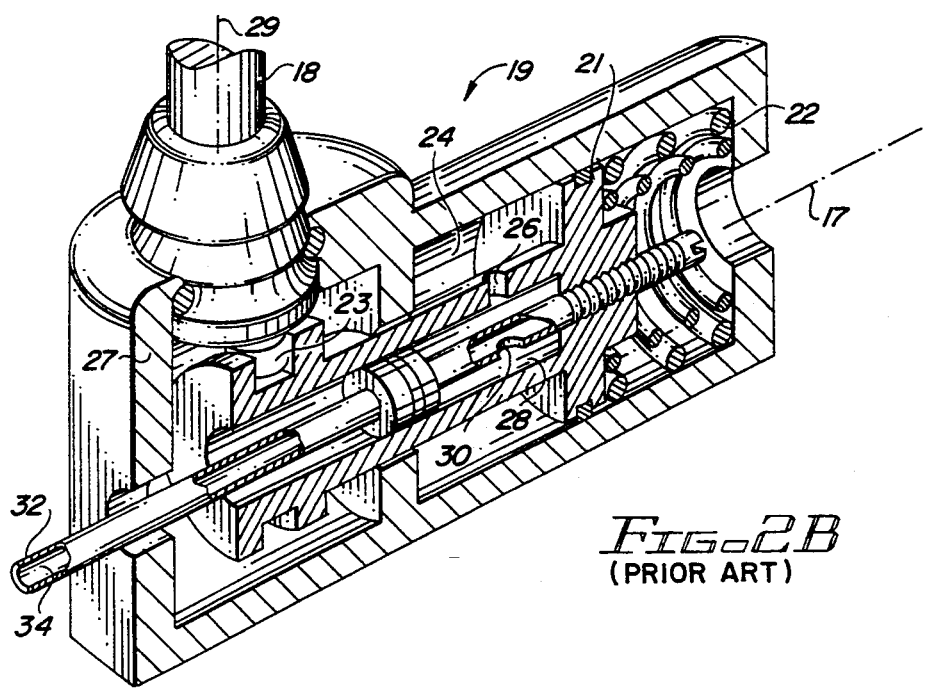
FIG. 2B is a perspective cutaway of a single action propeller pitch control piston operated by the apparatus in FIG. 2A.

FIG. 2B illustrates a conventional propeller pitch control actuator 19 as may be utilized in conjunction with the control contemplated by the present invention. The blades 18 (only one shown in FIG. 2B) are fixed to rotate with a rotating blade housing 27 about the hub centerline 17. The blade 18 can also rotate or swivel within the housing 27 about the blade pitch centerline 29 to change the blade pitch. An eccentric roller 23 is attached to the blade 18 on the periphery of the bottom of the blade 18 in offset relation to the pitch axis of rotation 29, and is moved by a pitch control piston 21. The pitch control piston 21 slides in a back and forth motion within the housing 27 moving the disk 23 to rotate blade 18. The pitch control piston 21 is biased on one side by a spring 22 and on the other by a chamber 24 that fills with hydraulic fluid. The piston also contains a bore 28 carrying beta tube 32 that is firmly secured to piston 21 to both rotate with the housing 27 and translate with piston 21. The hydraulic fluid is supplied from the beta tube interior 34 through a hole 30 to the piston bore 28 and then through a hole 26 to the hydraulic chamber 24. The pitch control piston 21 movement is thus dependent on the supply of hydraulic fluid to chamber 24 to react against the spring 22.

In operation, the propeller variable pitch control 14 is in a balanced or in a stationary state when the hydraulic exhausts 56 and 36 are partially covered by pilot valve sleeve 84 and the control valve 51 respectively. Fluid flow into chamber 64 through orifice 66 and subsequent discharge through port 56, maintains a pressure in chamber 64 which is lower than that in chamber 62. In this state, servo piston 40 is stationary because the product of the associated pressure times exposed piston area in chamber 64, is equal to the product of associated higher pressure times exposed piston area in chambers 62 and 63. The pitch control piston 21 is stationary because the product of pressure times area in chamber 24 is equal to the spring 22 force.

When changing blade pitch, a leftward movement of the pitch control piston 21 as depicted in FIG. 2B positions the blade 18 at a more positive pitch angle. In the preferred embodiment, the FADEC 80 increases blade pitch by signalling the motor 82 to move the pilot control sleeve 84 in the leftward direction in FIG. 2A. This exposes more of port 56 to the gearbox 73 and increases the flow therethrough. The increased flow through hole 56 decreases the pressure in chamber 64 because the area of opening of port 56 is now greater than the cross-sectional area of orifice 66. The pressure in chambers 62 and 63 then forces the servo piston 40 in the leftward direction until the port 56 is again partially covered by the pilot control sleeve 84. Once the port 56 is partially covered again, the pressure in chamber 64 increases and the servo piston 40 becomes stationary at the new location.

This leftward motion of servo piston 40 causes shaft rod 50 and associated power servo control valve 51 to cover opening 38 and to uncover opening 36. This allows rapid fluid dump from the beta tube 32 to the gearbox 73. The loss of hydraulic fluid from the beta tube 32 decreases the hydraulic pressure in hydraulic chamber 24, allowing spring 22 to push the pitch control piston 21 and the attached beta tube 32 leftwardly until hole 36 is partially covered and hole 38 is partially exposed again. Once the holes are partially exposed again, the product of pressure and area in chamber 24 again equals the force of spring 22, and piston 21 becomes stationary at the new location. As explained earlier, the leftward movement of piston 21 moves disk 23 which rotates blade 18 into an increased blade pitch.

In emergency situations the blade 18 can be forced into a feather position by dumping the hydraulic fluid from chamber 24 and allowing the spring 22 to position the piston 21 in its furthest leftward position. Spring 92 loads pilot sleeve 84 against stepper motor 82.

In a similar manner, the FADEC 80 decreases blade pitch by signalling the motor 82 to move the pilot sleeve 84 in the rightward direction, further covering port 56. This movement increases the pressure in chamber 64 to shift the servo piston 40 rightwardly until the port 56 is re-opened. The rightward motion of servo piston 40 causes shaft 50 to further uncover opening 38 while further covering the opening 36. This rapidly increases the amount of hydraulic fluid entering the beta tube 32 which increases the pressure in chamber 24. The hydraulic fluid shifts the pitch control piston 21 and the beta tube 32 rightwardly until openings 38 and 36 are both partially covered again. The rightward movement of the pitch control piston 21 also moves the disk 23 to decrease the blade 18 pitch angle.

The FADEC 80 can be programmed to adjust blade pitch similarly to when controlling fuel supplies, by using various flight control parameters. Using the FADEC 80 will avoid the overrunning required in prior art pitch control devices.

Accordingly, it will now be apparent that very low power electrical signals can readily shift pilot valve sleeve 84. This controls fluid flow in servo motor 14 to drive the latter in opposite directions to generate the much higher forces necessary to position the servo control valve (the reduced diameter section 51 of the shaft 50) to correspondingly drive the pitch actuator 19. The integral configuration of the double-acting servo motor 14 with its opposed rods or shafts provide a high compact, lightweight, economical pitch control.

While the present invention has been depicted and described by reference to a particular embodiment in order to explain the invention, no limitation upon the invention is implied by such reference. It is understood that various modifications may be made to the preferred embodiment without departing from the scope of the invention. For instance, one skilled in the art would understand that the invention is readily suitable for use with a double-acting propeller pitch actuator rather than the single acting actuator 19 illustrated. The invention is intended to be limited only by the spirit and scope of the appended claims.

What is claimed is:

1. A variable pitch propeller assembly comprising:
   a hub carrying a plurality of radially extending propeller blades, said propeller blades mounted to rotate within said hub to adjust blade pitch;
   a propeller pitch piston positioned to translate within said hub and connected to said propeller blades such that translation of said propeller pitch piston rotates said propeller blades, said propeller pitch piston having two opposing faces and biased on one face by a spring and biased on the opposing face by a supply of hydraulic fluid;
   a tube secured to said propeller pitch piston to translate therewith and to supply said hydraulic fluid;
   a servo piston positioned to translate within a housing, said servo piston dividing said housing into first and second chambers and having a first opposing surface and a second opposing surface, said first and second opposing surfaces being biased by hydraulic fluid in said first and second chambers respectively;
   a first bored shaft secured to translate with and extending from said first opposing surface of said servo piston, said first bored shaft extending from said housing to receive said tube such that said tube is translatable relative to said first bored shaft;
   a second bored shaft secured to translate with and extending from said second opposing surface of said servo piston, said second bored shaft extending out of said housing and containing a fluid exhaust port; and
   means for opening and covering said fluid exhaust port to a low pressure return to adjust blade pitch.

2. The variable pitch propeller assembly of claim 1 wherein said means for opening and covering said fluid exhaust port includes:
   a pilot valve member for covering said fluid exhaust port;
   a motor for moving said pilot valve member; and
   a controller for electronically operating said motor.

3. The variable pitch propeller assembly of claim 2 wherein said pilot valve member is a pilot sleeve which circumferentially surrounds said second bored shaft and translates thereon to open and cover said fluid exhaust port.

4. The variable pitch propeller assembly of claim 3 wherein said motor is a stepper motor.

5. The variable pitch propeller assembly of claim 1 wherein said housing contains a supply port for receiving said supply of hydraulic fluid into said first chamber.

6. The variable pitch propeller assembly of claim 5 further including an orifice between said first and said second chambers to allow said hydraulic fluid to flow from said first chamber to said second chamber.

7. The variable pitch propeller assembly of claim 6, wherein said orifice comprises a flow restricting passage extending through said servo piston from said first to said second opposing surfaces thereof.

8. The variable pitch propeller assembly of claim 6, wherein said tube includes pressure and exhaust openings for respectively connecting said propeller pitch piston with said supply of hydraulic fluid and with said low pressure fluid return.

9. The variable pitch propeller assembly of claim 8, wherein said first bored shaft includes a passage for delivering said supply of hydraulic fluid to said pressure opening in said tube.

10. A control for a hydraulic propeller pitch actuator comprising:
    a power servo control valve for controlling flow of pressurized hydraulic fluid to move said actuator in opposite directions;
    a hydraulic servo motor movable in opposite directions and mechanically connected to said servo control valve to move the latter in opposite directions, said servo motor comprising a double acting, hydraulic cylinder having a piston movable in opposite directions, said piston connected to said servo control valve, said cylinder having an exhaust port;
    a low power pilot valve movable in opposite directions to control pressurized fluid flow to drive said servo motor;
    an input signal member, responsive to a low power, digital electrical signal, mechanically connected to said pilot valve to move the latter in opposite directions; and
    means for defining a passage in fluid communication with said actuator, said means including pressure and exhaust openings for respectively connecting said actuator with pressurized fluid flow and low pressure fluid return,
    said servo control valve comprising a servo member movable in opposite directions between a first position uncovering said pressure opening while blocking said exhaust opening, and a second position blocking said pressure opening while uncovering said exhaust opening.

11. A control as set forth in claim 10, wherein said pilot valve comprises a pilot member movable in opposite directions to open and close said exhaust port.

12. A control as set forth in claim 11, wherein said exhaust port is carried by and movable with said piston.

13. A control as set forth in claim 12, wherein said piston includes a passage for carrying hydraulic fluid in said cylinder from one side of the piston to the other, and a flow restricting orifice in said passage, said exhaust port opening into said cylinder on said other side of the piston.

14. A control as set forth in claim 13, wherein said input signal member includes an electrical stepper motor operable to drive said pilot member in opposite directions.

15. A control as set forth in claim 13, wherein said pilot member is a sleeve shiftable in opposite directions to open and close said exhaust port.

16. A control as set forth in claim 10, wherein said means for defining a passage comprises a hollow, closed-end tube, said servo member comprising a servo sleeve concentrically surrounding said tube.

17. A control as set forth in claim 16, wherein one end of said tube is received within a blind central bore in said piston, the other end of said tube being affixed to and movable with said actuator.

18. In a hydraulically operated variable pitch propeller actuator of the type having an elongated tube for hydraulically communicating with said actuator, one end of said tube secured to said actuator and the other remote end disposed at a remote location, said tube having spaced pressure and exhaust openings near said remote end;

a housing having an internal bore;

a piston shiftable within said bore and dividing said bore into separate first and second chambers on opposite sides of said piston, said piston having first and second rods extending through opposite ends of the housing, said first rod having a blind bore receiving said remote end of the tube and cooperating therewith to selectively cover and uncover said pressure and exhaust openings, said first rod having a port for communicating said first chamber with said blind bore, said second rod having an exhaust port and an exhaust duct communicating said second chamber with said exhaust port;

pressure supply means for delivering pressurized fluid flow to said first and second chambers;

means for restricting rate of fluid flow from said supply means into said second chamber; and a pilot valve control member movable on said second rod to open and close said exhaust port in the second rod.

* * * * *